(12) United States Patent
Gopal et al.

(10) Patent No.: US 12,526,747 B2
(45) Date of Patent: Jan. 13, 2026

(54) FAST ANTENNA SWITCHED DIVERSITY

(71) Applicant: QUALCOMM Incorporated, San Diego, CA (US)

(72) Inventors: Thawatt Gopal, San Diego, CA (US); Qi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 689 days.

(21) Appl. No.: 17/454,156

(22) Filed: Nov. 9, 2021

(65) Prior Publication Data
US 2022/0287100 A1  Sep. 8, 2022

Related U.S. Application Data

(60) Provisional application No. 63/156,840, filed on Mar. 4, 2021.

(51) Int. Cl.
*H04B 17/318* (2015.01)
*H04B 17/336* (2015.01)
*H04W 52/14* (2009.01)
*H04W 52/36* (2009.01)
*H04W 74/0833* (2024.01)

(52) U.S. Cl.
CPC ........ *H04W 52/146* (2013.01); *H04B 17/318* (2015.01); *H04B 17/336* (2015.01); *H04W 52/36* (2013.01); *H04W 74/0833* (2013.01)

(58) Field of Classification Search
CPC .. H04B 7/0608; H04B 17/318; H04B 17/336; H04W 52/146; H04W 52/36; H04W 74/0833; H04W 74/0836; H04W 74/0838
See application file for complete search history.

(56) References Cited

U.S. PATENT DOCUMENTS

| | | | | |
|---|---|---|---|---|
| 9,578,580 | B1 * | 2/2017 | Ishfaq | H04W 36/008375 |
| 2009/0175220 | A1 * | 7/2009 | Yi | H04L 1/1893 |
| | | | | 370/328 |
| 2013/0309981 | A1 * | 11/2013 | Ngai | H04B 7/0608 |
| | | | | 455/78 |
| 2014/0233665 | A1 * | 8/2014 | Clevorn | H04B 7/061 |
| | | | | 375/267 |
| 2015/0094003 | A1 * | 4/2015 | Ramkumar | H04B 7/0604 |
| | | | | 455/101 |
| 2015/0201383 | A1 * | 7/2015 | Papasakellariou | H04W 52/367 |
| | | | | 455/562.1 |
| 2015/0282196 | A1 * | 10/2015 | Kim | H04B 7/0608 |
| | | | | 370/252 |

(Continued)

FOREIGN PATENT DOCUMENTS

| | | | | |
|---|---|---|---|---|
| WO | WO-2007058494 A1 * | 5/2007 | | H04B 7/0608 |
| WO | WO-2022028339 A1 * | 2/2022 | | |

*Primary Examiner* — Liem H. Nguyen
(74) *Attorney, Agent, or Firm* — Harrity & Harrity, LLP

(57) ABSTRACT

Various aspects of the present disclosure generally relate to wireless communication. In some aspects, a user equipment (UE) may perform a fast antenna switched diversity evaluation by obtaining at least two signal measurements for each transmit antenna of the UE based at least in part on detecting one or more triggering conditions for switching one or more transmit antennas of the UE. The UE may switch the one or more transmit antennas based at least in part on the at least two signal measurements for each transmit antenna. Numerous other aspects are described.

30 Claims, 7 Drawing Sheets

(56) References Cited

U.S. PATENT DOCUMENTS

| | | | |
|---|---|---|---|
| 2021/0058806 A1* | 2/2021 | Hong | B64C 39/024 |
| 2021/0127424 A1* | 4/2021 | Yasukawa | H04W 72/046 |
| 2021/0377876 A1* | 12/2021 | Jeon | H04W 24/08 |
| 2023/0284283 A1* | 9/2023 | Xu | H04B 7/0695 |
| | | | 370/329 |
| 2023/0300891 A1* | 9/2023 | Su | H04W 74/002 |
| | | | 370/329 |

* cited by examiner

FAST ANTENNA SWITCHED DIVERSITY

CROSS-REFERENCE TO RELATED APPLICATION

This Patent Application claims priority to U.S. Provisional Patent Application No. 63/156,840, filed on Mar. 4, 2021, entitled "FAST ANTENNA SWITCHED DIVERSITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for fast antenna switched diversity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE. "Uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes obtaining at least two signal measurements for each transmit antenna of the UE based at least in part on detecting one or more triggering conditions for switching one or more transmit antennas of the UE, and switching the one or more transmit antennas based at least in part on the at least two signal measurements for each transmit antenna.

In some aspects, a UE for wireless communication includes a memory and one or more processors, coupled to the memory, configured to obtain at least two signal measurements for each transmit antenna of the UE based at least in part on detecting one or more triggering conditions for switching one or more transmit antennas of the UE, and switch the one or more transmit antennas based at least in part on the at least two signal measurements for each transmit antenna.

In some aspects, a non-transitory computer-readable medium storing a set of instructions for wireless communication includes one or more instructions that, when executed by one or more processors of a UE, cause the UE to obtain at least two signal measurements for each transmit antenna of the UE based at least in part on detecting one or more triggering conditions for switching one or more transmit antennas of the UE, and switch the one or more transmit antennas based at least in part on the at least two signal measurements for each transmit antenna.

In some aspects, an apparatus for wireless communication includes means for obtaining at least two signal measurements for each transmit antenna of the apparatus based at least in part on detecting one or more triggering conditions for switching one or more transmit antennas of the apparatus, and means for switching the one or more transmit antennas based at least in part on the at least two signal measurements for each transmit antenna.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
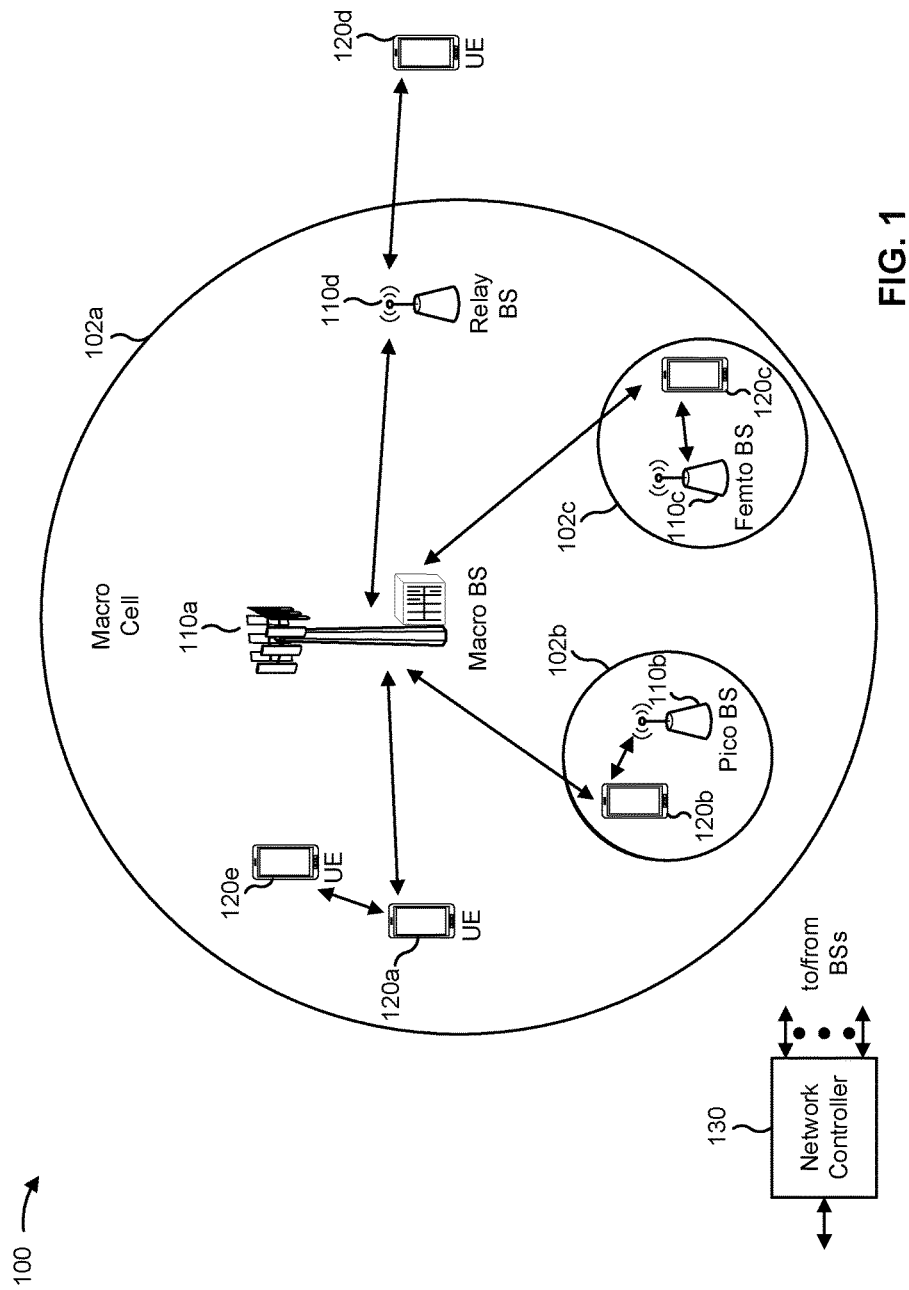
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

The wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. The network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). The UE 120 may be included inside a housing that houses components of the UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of the wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
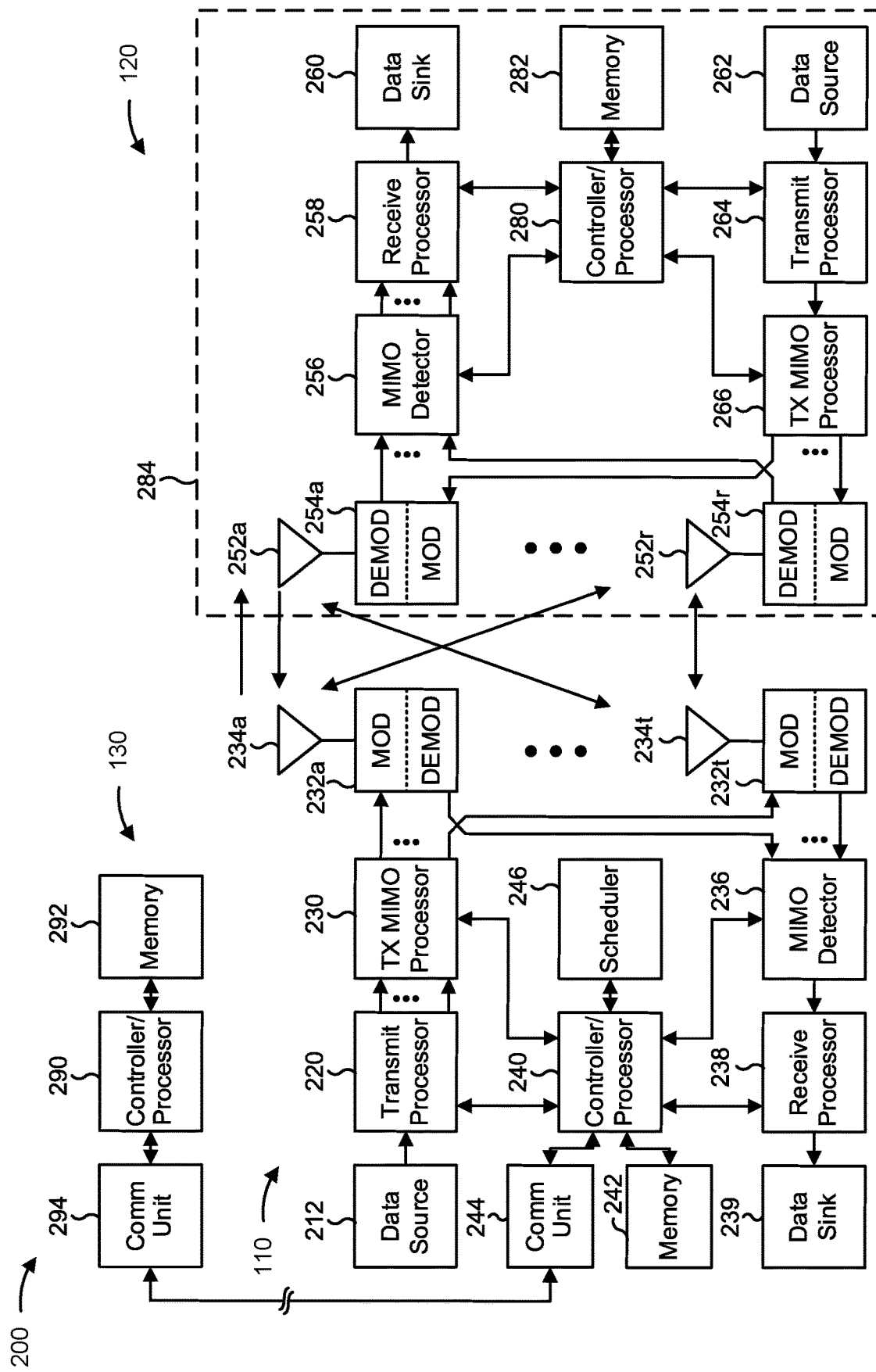
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS)

for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. The transmit processor 220 may also generate reference symbols for reference signals (e.g., a cell-specific reference signal (CRS), a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At the UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of the UE 120 may be included in a housing 284.

The network controller 130 may include communication unit 294, controller/processor 290, and memory 292. The network controller 130 may include, for example, one or more devices in a core network. The network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. The transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to the base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At the base station 110, the uplink signals from the UE 120 and other UEs may be received by antennas 234, processed by demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to controller/processor 240. The base station 110 may include communication unit 244 and communicate to the network controller 130 via the communication unit 244. The base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

The controller/processor 240 of the base station 110, the controller/processor 280 of the UE 120, and/or any other component(s) of FIG. 2 may perform one or more techniques associated with fast antenna switched diversity (As-div), as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memories 242 and 282 may store data and program codes for the base station 110 and the UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for obtaining at least two signal measurements for each transmit antenna of the UE 120 based at least in part on detecting one or more triggering conditions for switching one or more transmit antennas of the UE 120, and/or means for switching the one or more transmit antennas based at least in part on the at least two signal measurements for each transmit antenna. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for obtaining, as a first signal measurement of the at least two signal measurements for each transmit antenna, a stored signal measurement having an age that satisfies a freshness threshold, and/or means for measuring, as a second signal measurement of the at least two signal measurements, a signal of each transmit antenna.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
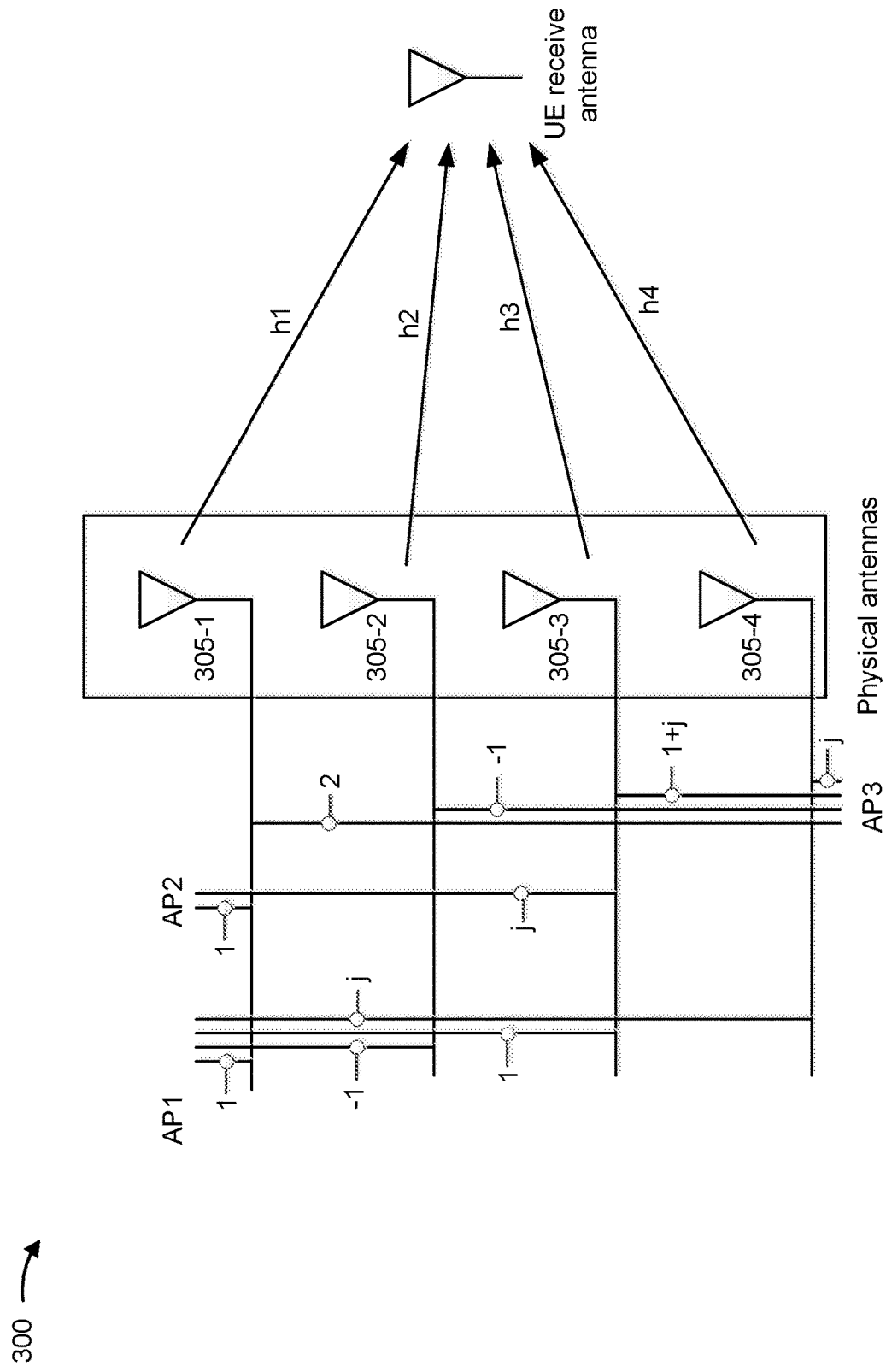
FIG. 3 is a diagram illustrating an example of antenna ports, in accordance with the present disclosure.

FIG. 3 is a diagram illustrating an example 300 of antenna ports, in accordance with the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and "precoder" may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

A UE may be able to switch antennas for transmission and reception, to diversify antenna selection and beamforming. This may be referred to as "antenna switched diversity" or "Asdiv." The UE may rely on periodic measurements of signals to and/or from the antennas in order to get antenna metrics such as an RSRP, a signal-to-noise ratio (SNR), a transmit power headroom, and/or other antenna metrics. The transmit power headroom may be an amount of transmit power that is left for increasing the transmit power before reaching a maximum allowable transmit power. The UE may be configured to use current transmit antennas, and the UE may evaluate the antenna metrics of all of the transmit antennas to determine if there is a better transmit antenna to use than a current transmit antenna. For example, the UE may switch to an antenna with a greater SNR than an SNR of a current transmit antenna.

The UE may establish a radio resource control (RRC) connection with a base station in order to transmit and receive communications. During RRC connection setup and initial call transition to RRC connected mode, there may be frequent RRC reconfiguration events triggered by the network. RRC reconfiguration may suspend antenna measurements or other use of the antennas so that the UE may receive reconfiguration information and implement a reconfiguration of the RRC connection. Frequent RRC reconfiguration events may cause a delay in Asdiv evaluation. The delay may typically be at least 640 ms plus a hold timer ($T_{hold}$) that may be used to wait and see if there is any other change in the configuration before resuming evaluation. The hold timer may be another 500 ms, and thus a total delay in Asdiv evaluation may be over a second. This long delay may increase the risk of radio link failure (RLF) if detecting and addressing antenna blockages takes too long to detect and address antenna blockages. Delays in Asdiv evaluation may cause the UE to consume additional time and signaling resources, and RLF may cause the UE to consume time, power, processing resources, and signaling resources to recover from the RLF.

According to various aspects described herein, instead of waiting for what could be more than a second, the UE may perform a fast Asdiv evaluation after detecting one or more triggering conditions. The fast Asdiv evaluation may include obtaining at least two measurements from each transmit antenna of the UE, by performing measurements or obtaining recent measurements. The UE may not wait for a delay or timer to begin the fast Asdiv evaluation.

A triggering condition may indicate that there is a problem with uplink transmission by the current transmit antennas of the UE. The UE may detect one of multiple triggering conditions. For example, a triggering condition may include transmission of a random access channel (RACH) message at a maximum allowable transmit power. The triggering condition may also include transmission of a RACH message, filtered via an infinite impulse response (IIR) filter type, that satisfies a power threshold. The triggering condition may include transmission of multiple RACH messages with an average transmit power that satisfies a power threshold.

In some aspects, retransmission of a RACH message may be a triggering condition. For example, the triggering condition may include reception of a hybrid automatic repeat request (HARQ) negative acknowledgment (NACK) for a RACH message, or expiration of a timer for receiving a HARQ acknowledgment (ACK). By performing a fast Asdiv evaluation upon detecting a trigger rather than waiting for a full antenna evaluation after the usual delays, the UE may quickly switch to a better transmit antenna to avoid an antenna blockage issue and to avoid RLF.

In some aspects, performing a fast Asdiv evaluation upon detecting a defined triggering condition may enable the UE to evaluate transmit antennas before a received RRC reconfiguration message halts or delays antenna evaluations. For example, the UE may take 100-200 ms for a triggered fast Asdiv evaluation rather than more than 1100 ms under existing antenna evaluation procedures. As a result, the UE has a better chance of maintaining a radio link and conserves time, power, processing resources, and signaling resources that would otherwise be consumed by reestablishing a failed link or sending retransmissions due to blockage of a transmit antenna.

In some scenarios of inter-band uplink carrier aggregation, the UE may use a secondary cell (SCell) for uplink transmission. The network may initially configure the SCell for the UE and then later activate the SCell for the UE with an SCell activation command (e.g., via a medium access control control element (MAC CE)), when there is sufficient user data. During SCell configuration, a UE may not be monitoring all available antennas. For example, if the UE is capable of using 4 transmit antennas for an operating frequency band, the UE may only measure 2 out of the 4 antennas to conserve power. However, at SCell activation time, the UE may need to evaluate all 4 antennas to determine which of the 4 antennas is the best transmit antenna, in order to account for possible antenna blockage that could impair the UE's transmissions. In some aspects, rather than waiting until an SCell is actually activated before evaluating transmit antennas, the UE may perform a fast Asdiv evaluation upon receiving the SCell activation command.

As indicated above, FIG. 3 is provided merely as an example. Other examples may differ from what is described with regard to FIG. 3.

Figure 4:
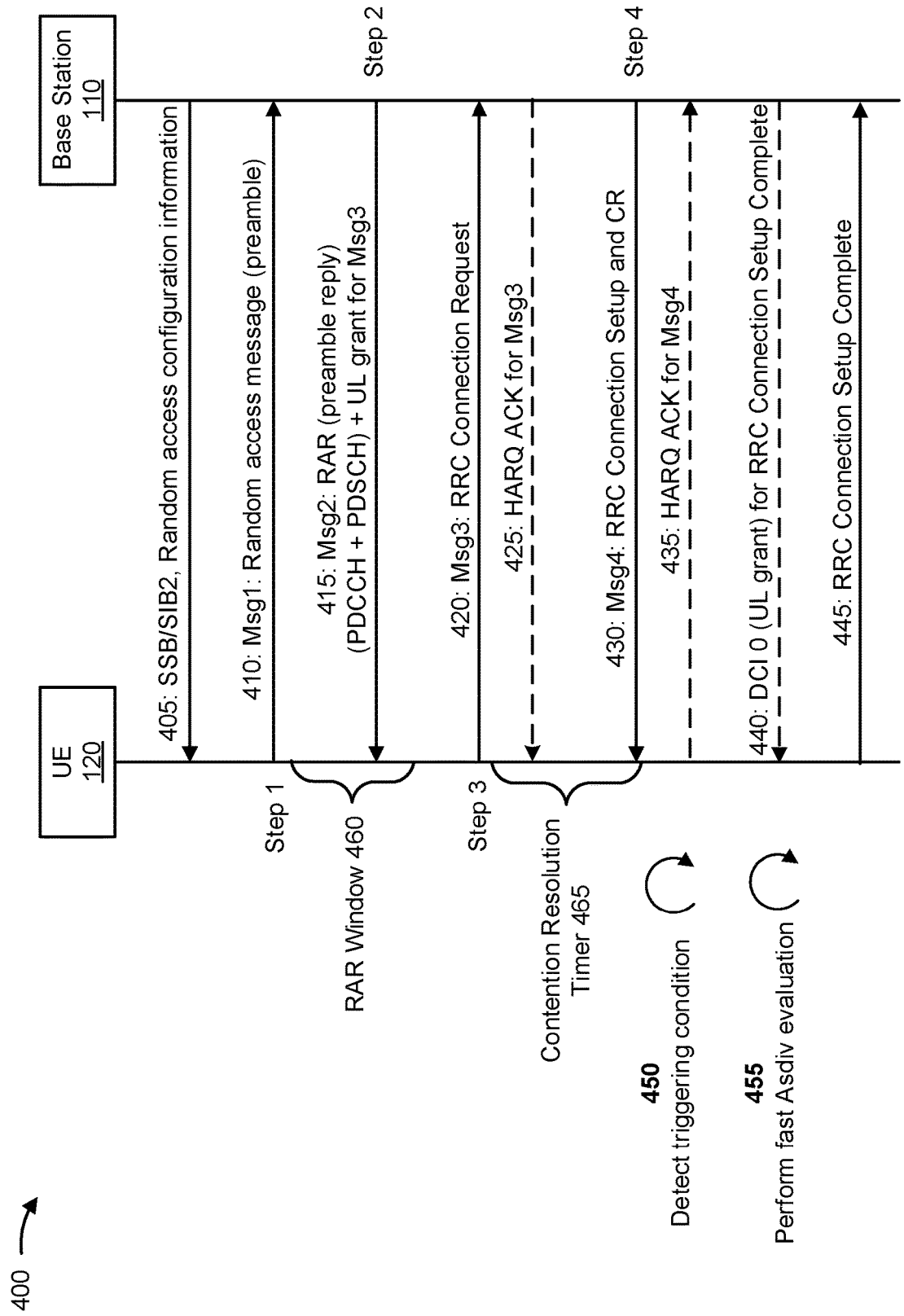
FIG. 4 is a diagram illustrating an example of fast antenna switched diversity as part of a 4-step random access channel procedure, in accordance with the present disclosure.

FIG. 4 is a diagram illustrating an example 400 of fast antenna switched diversity as part of a 4-step RACH procedure, in accordance with the present disclosure. As shown in FIG. 4, a base station 110 and a UE 120 may communicate with one another to perform the 4-step RACH procedure.

As shown by reference number 405, the base station 110 may transmit, and the UE 120 may receive, random access configuration information. In some aspects, the random access configuration information may be transmitted in and/or indicated by system information (e.g., in one or more system information blocks (SIBs), such as a SIB 2) and/or a synchronization signal block (SSB), such as for contention-based random access. Additionally, or alternatively, the random access configuration information may be transmitted in an RRC message and/or a physical downlink control channel (PDCCH) order message that triggers a RACH procedure, such as for contention-free random access. The random access configuration information may include one or more parameters to be used in the RACH procedure, such as one or more parameters for transmitting a random access message (RAM) and/or one or more parameters for receiving a random access response (RAR).

As shown by reference number 410, the UE 120 may transmit a RAM, which may include a preamble (sometimes referred to as a random access preamble, a physical RACH (PRACH) preamble, or a RAM preamble). The message that includes the preamble may be referred to as a message 1, Msg1, msg1, MSG1, a first message, or an initial message in a 4-step RACH procedure. The RAM may include a random access preamble identifier.

As shown by reference number 415, the base station 110 may transmit an RAR as a reply to the preamble. The message that includes the RAR may be referred to as message 2, Msg2, msg2, MSG2, or a second message in a 4-step RACH procedure. In some aspects, the RAR may indicate the detected random access preamble identifier (e.g., received from the UE 120 in Msg1). Additionally, or alternatively, the RAR may indicate an uplink grant or a resource allocation to be used by the UE 120 to transmit message 3 (Msg3).

In some aspects, as part of the second step of the 4-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the 4-step RACH procedure, the base station 110 may transmit the PDSCH communication for the RAR, as scheduled by the PDCCH communication. The RAR may be included in a MAC protocol data unit (PDU) of the PDSCH communication.

As shown by reference number 420, the UE 120 may transmit an RRC connection request message. The RRC connection request message may be referred to as message 3, Msg3, msg3, MSG3, or a third message of a 4-step RACH procedure. In some aspects, the RRC connection request may include a UE identifier, uplink control information (UCI), and/or a physical uplink shared channel (PUSCH) communication (e.g., an RRC connection request). As shown by reference number 425, the base station 110 may transmit a HARQ ACK for Msg3.

As shown by reference number 430, the base station 110 may transmit an RRC connection setup message. The RRC connection setup message may be referred to as message 4, Msg4, msg4, MSG4, or a fourth message of a 4-step RACH procedure. In some aspects, the RRC connection setup message may include the detected UE identifier, a timing advance value, and/or contention resolution information. If the UE 120 successfully receives the RRC connection setup message, the UE 120 may transmit a HARQ ACK. As shown by reference number 435, the UE 120 may transmit a HARQ ACK for Msg4. As shown by reference number 440, the base station 110 may transmit downlink control information (DCI) with an uplink grant for an RRC connection setup complete message, which indicates that the UE 120 has completed setting up the RRC connection. As shown by reference number 445, the UE 120 may transmit the RRC connection setup complete message.

As shown by reference number 450, the UE 120 may detect a triggering condition for performing a fast Asdiv evaluation. As shown by reference number 455, the UE 120 may perform the fast Asdiv evaluation based at least in part on detecting the triggering condition. The fast Asdiv evaluation may include obtaining at least two signal measurements (e.g., RSRP, SNR, transmit power headroom) for each antenna that may operate as a transmit antenna. At least two measurements may be used so that the UE may make a more robust antenna switching determination that avoids reaction to transients around the environment of the UE. In some aspects, if necessary, the fast Asdiv evaluation may include one measurement, or the measurements may be for a subset of antennas rather than for all of the antennas.

The UE 120 may obtain the measurements for each antenna by performing measurements or by obtaining stored measurements (from memory) with ages that satisfy a freshness threshold. The freshness threshold may be a duration of time since the measurement for which the measurement is likely to be accurate (e.g., measurement was taken less than 320 ms ago). For example, if there are two measurements for each antenna that were taken 100 ms prior, the UE 120 may use these two measurements for each antenna as part of the fast Asdiv evaluation. In another example, if the UE 120 performed one measurement for each antenna before receiving an RRC reconfiguration message, which suspended the fast Asdiv evaluation, the UE 120 may perform only one measurement for each antenna after the RRC reconfiguration. In one example, if measurements for some transmit antennas were recently performed, the UE 120 may obtain measurements for the other transmit antennas for which there are no recent measurements or there is only one measurement.

Some of the triggering conditions for performing fast Asdiv may include indications of a problem with uplink transmissions or with RRC messages. These indications may be part of a RACH procedure (e.g., 4-step RACH, 2-step RACH). Example 400 shows possible triggering conditions, or triggers, for performing fast Asdiv as part of a 4-step RACH procedure. For example, a trigger may include transmission of Msg1 or Msg 3 at a maximum allowable transmit power. The UE 120 may transmit repetitions of a RACH message and if there is an issue with a first RACH message being received by the base station 110, the UE 120 may transmit another repetition with a greater (higher) transmit power, such as with a transmit power gain of 0 decibel-milliwatts (dBm), then with 3 dBm, then with 6 dBm, up to the maximum allowable transmit power (e.g., 20 dBm). Transmission at a maximum allowable power may indicate that there is an issue with regard to transmitting from one or more transmit antennas, and thus the UE 120 should perform a fast Asdiv evaluation.

In some aspects, a trigger may include transmission of multiple RACH messages, such as transmission of one or more Msg 1 repetitions and/or one or more Msg3 repetitions, where an average transmit power or running average transmit power of these transmissions satisfies a power threshold (e.g., minimum transmit power to indicate an issue, such as 10 dBm). For example, if the UE 120 transmits 3 Msg1 repetitions at 6 dBm, 12 dBm, and 12 dBm, respectively, and a Msg3 repetition at 10 dBm, the running average may have reached 10 dBm, because (6+12+12+10)/4=10. In some aspects, a trigger may include transmission of a RACH message that is filtered via an IIR type filter with a configurable time constant (e.g., 100 ms) and that satisfies a power threshold (e.g., minimum transmit power to indicate an issue, such as 10 dBm).

There may be other indications of uplink transmission issues. After the UE 120 transmits the Msg1, the UE 120 may start an RAR window 460, in which the UE 120 is expected to receive a Msg2 from the base station 110. If the RAR window 460 expires without the UE 120 receiving a Msg2, then there may be an issue with the base station 110 receiving the Msg1 from the UE 120. The UE 120 may then start a fast Asdiv evaluation. Similarly, after the UE 120 transmits a Msg3, the UE 120 may start a contention resolution timer 465 in which the UE 120 expects to receive a Msg4 from the base station 110. If the contention resolution timer 465 expires without the UE 120 receiving the Msg4, the UE 120 may start a fast Asdiv evaluation. The UE 120 may also start a fast Asdiv evaluation if the UE 120 receives a HARQ NACK for the Msg1 or for the Msg3. In other words, if the UE 120 detects that a retransmission of a RACH message is to be transmitted, possibly due to an antenna blocking issue, the UE 120 may start a fast Asdiv evaluation to switch antennas. The UE 120 may detect a trigger at Step 2, Step 3, or Step 4, or the UE 120 may detect a trigger after the RRC connection setup complete message.

In some aspects, the UE 120, based at least in part on the two signal measurements for each antenna (or set of antennas) obtained during the fast Asdiv evaluation, may switch to one or more transmit antennas with one or two signal measurements that satisfy a threshold, whether it is an RSRP threshold (e.g., minimum RSRP), an SNR threshold (e.g., minimum SNR), or a transmit power headroom threshold (e.g., minimum transmit power headroom). The UE 120 may filter and/or use averages across multiple signal measurements in order to make a switching determination more reliable and robust. This also helps the UE 120 to avoid reacting to transients in the environment around the UE 120. In some aspects, the UE 120 may switch from one or more current transmit antennas to one or more transmit antennas that have better antenna metrics (e.g., greater RSRP, greater SNR, greater transmit power headroom). In some aspects, the UE 120 may switch from a current transmit antenna to a transmit antenna with a greatest RSRP, a greatest SNR, or a greatest transmit power headroom. The UE 120 may also switch to multiple transmit antennas, such as a transmit antenna with a greatest measurement, a transmit antenna with a next greatest measurement, and so forth.

By performing a fast Asdiv evaluation and switching to a better transmit antenna or transmit antennas, the UE 120 maintains a stronger radio link and avoids RLF and retransmissions. As a result, the UE 120 conserves time, power, processing resources, and signaling resources. Furthermore, the UE 120 may reliably send uplink signaling and control messages during an initial transition to RRC connected-mode state, where there are typically many RRC and physical uplink control channel (PUCCH) control messages being exchanged with the network. Failure to send a signaling or control message may cause RLF or a significant delay in the UE 120 being able to complete RRC signaling or control message exchange with the network. Performing a fast Asdiv evaluation based on the triggers explained above may avoid such signaling failures.

As indicated above, FIG. 4 is provided as an example. Other examples may differ from what is described with regard to FIG. 4.

Figure 5:
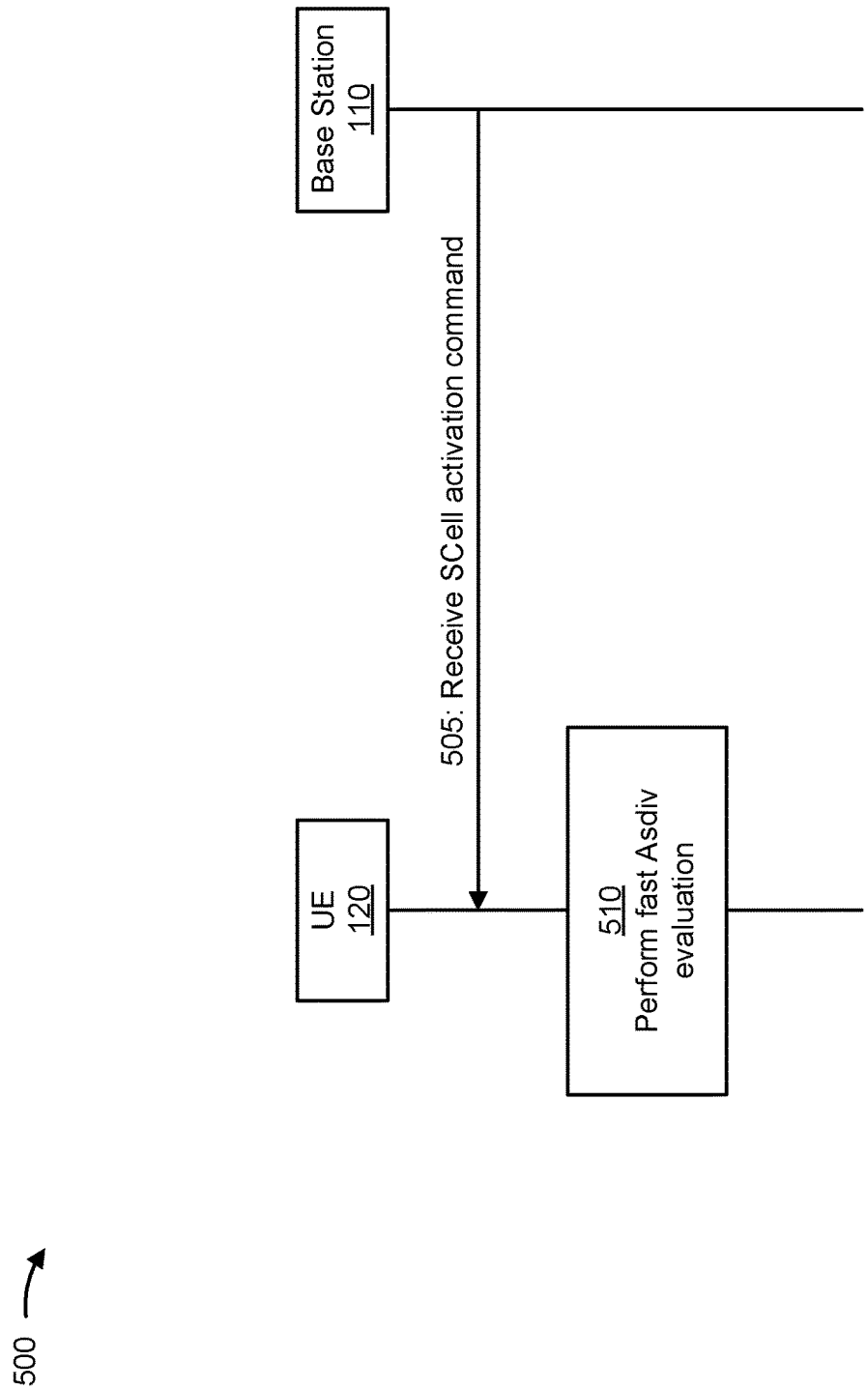
FIG. 5 is a diagram illustrating an example of a fast antenna switched diversity evaluation, in accordance with the present disclosure.

FIG. 5 is a diagram illustrating an example 500 of a fast antenna switched diversity evaluation, in accordance with the present disclosure. Example 500 shows a UE 120 and a base station 110 that may communicate with each other over a wireless network, such as wireless network 100.

As shown by reference number 505, the base station 110 may transmit, and the UE 120 may receive, an SCell activation command. The base station 110 may transmit the SCell activation command in a MAC CE. As shown by reference number 510, the UE 120 may perform a fast Asdiv evaluation based at least in part on receiving the SCell activation command. For example, the UE 120 may obtain at least two measurements for each transmit antenna and switch one or more transmit antennas, as described in connection with FIG. 4.

As indicated above, FIG. 5 is provided as an example. Other examples may differ from what is described with regard to FIG. 5.

Figure 6:
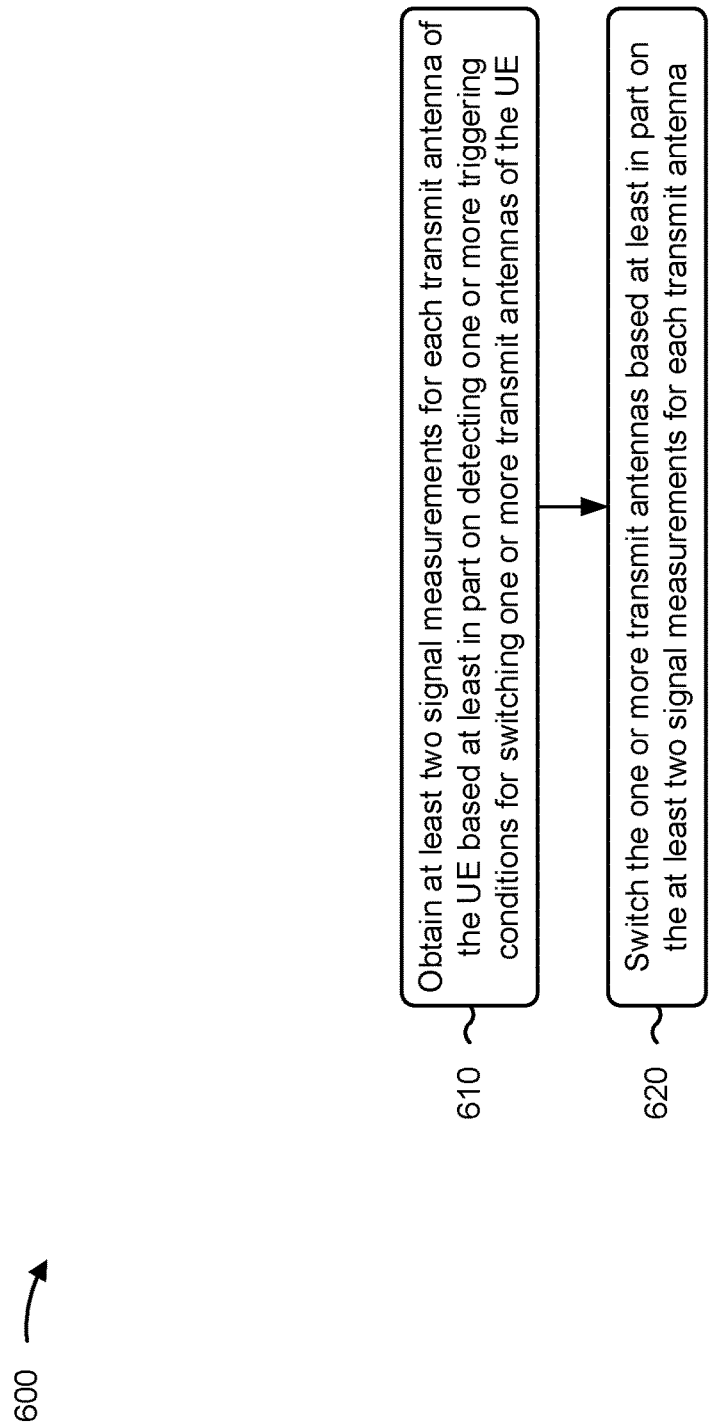
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with fast Asdiv.

As shown in FIG. 6, in some aspects, process 600 may include obtaining at least two signal measurements for each transmit antenna of the UE based at least in part on detecting one or more triggering conditions for switching one or more transmit antennas of the UE (block 610). For example, the UE (e.g., using evaluation component 708 depicted in FIG. 7) may obtain at least two signal measurements for each transmit antenna of the UE based at least in part on detecting one or more triggering conditions for switching one or more transmit antennas of the UE, as described above.

As further shown in FIG. 6, in some aspects, process 600 may include switching the one or more transmit antennas based at least in part on the at least two signal measurements for each transmit antenna (block 620). For example, the UE (e.g., using switching component 710 depicted in FIG. 7) may switch the one or more transmit antennas based at least in part on the at least two signal measurements for each transmit antenna, as described above.

Process 600 may include additional aspects, such as any single aspect or any combination of aspects described below and/or in connection with one or more other processes described elsewhere herein.

In a first aspect, the one or more triggering conditions include detection of a problem with uplink transmission from a transmit antenna.

In a second aspect, alone or in combination with the first aspect, the one or more triggering conditions include transmitting a RACH message with a maximum allowable transit power.

In a third aspect, alone or in combination with one or more of the first and second aspects, the one or more triggering conditions include transmitting one or more RACH messages, where an average transmit power of the one or more RACH messages satisfies a power threshold.

In a fourth aspect, alone or in combination with one or more of the first through third aspects, the one or more triggering conditions include transmitting one or more random access channel messages, filtered via an IIR type filter, that satisfy a power threshold.

In a fifth aspect, alone or in combination with one or more of the first through fourth aspects, the one or more triggering conditions include receiving a negative acknowledgment after transmitting a RACH message.

In a sixth aspect, alone or in combination with one or more of the first through fifth aspects, the RACH message is a msg1.

In a seventh aspect, alone or in combination with one or more of the first through sixth aspects, the RACH message is a msg3.

In an eighth aspect, alone or in combination with one or more of the first through seventh aspects, the one or more triggering conditions include expiration of an RAR window without the UE receiving a RACH msg2.

In a ninth aspect, alone or in combination with one or more of the first through eighth aspects, the one or more triggering conditions include expiration of a contention resolution timer without the UE receiving a RACH msg4.

In a tenth aspect, alone or in combination with one or more of the first through ninth aspects, the one or more triggering conditions include receiving an SCell MAC CE activation command.

In an eleventh aspect, alone or in combination with one or more of the first through tenth aspects, the obtaining includes obtaining the at least two signal measurements after transmitting an RRC connection setup complete message.

In a twelfth aspect, alone or in combination with one or more of the first through eleventh aspects, the obtaining includes measuring signals of each transmit antenna to obtain the at least two signal measurements for each transmit antenna.

In a thirteenth aspect, alone or in combination with one or more of the first through twelfth aspects, the obtaining includes obtaining, as the at least two signal measurements for each transmit antenna, at least two stored signal measurements having respective ages that satisfy a freshness threshold.

In a fourteenth aspect, alone or in combination with one or more of the first through thirteenth aspects, the obtaining includes obtaining, as a first signal measurement of the at least two signal measurements for each transmit antenna, a stored signal measurement having an age that satisfies a freshness threshold, and measuring, as a second signal measurement of the at least two signal measurements, a signal of each transmit antenna.

In a fifteenth aspect, alone or in combination with one or more of the first through fourteenth aspects, the switching includes switching to a transmit antenna with at least two RSRP measurements that satisfy an RSRP threshold.

In a sixteenth aspect, alone or in combination with one or more of the first through fifteenth aspects, the switching includes switching to a transmit antenna with a greater RSRP than a current transmit antenna.

In a seventeenth aspect, alone or in combination with one or more of the first through sixteenth aspects, the switching includes switching to a transmit antenna with at least two transmit power headroom measurements that satisfy a transmit power headroom threshold.

In an eighteenth aspect, alone or in combination with one or more of the first through seventeenth aspects, the switching includes switching to a transmit antenna with a greater transmit power headroom than a transmit power headroom of a current transmit antenna.

In a nineteenth aspect, alone or in combination with one or more of the first through eighteenth aspects, the switching includes switching to a transmit antenna with at least two SNR measurements that satisfy an SNR threshold.

In a twentieth aspect, alone or in combination with one or more of the first through nineteenth aspects, the switching includes switching to a transmit antenna with a greater SNR than an SNR of a current transmit antenna.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
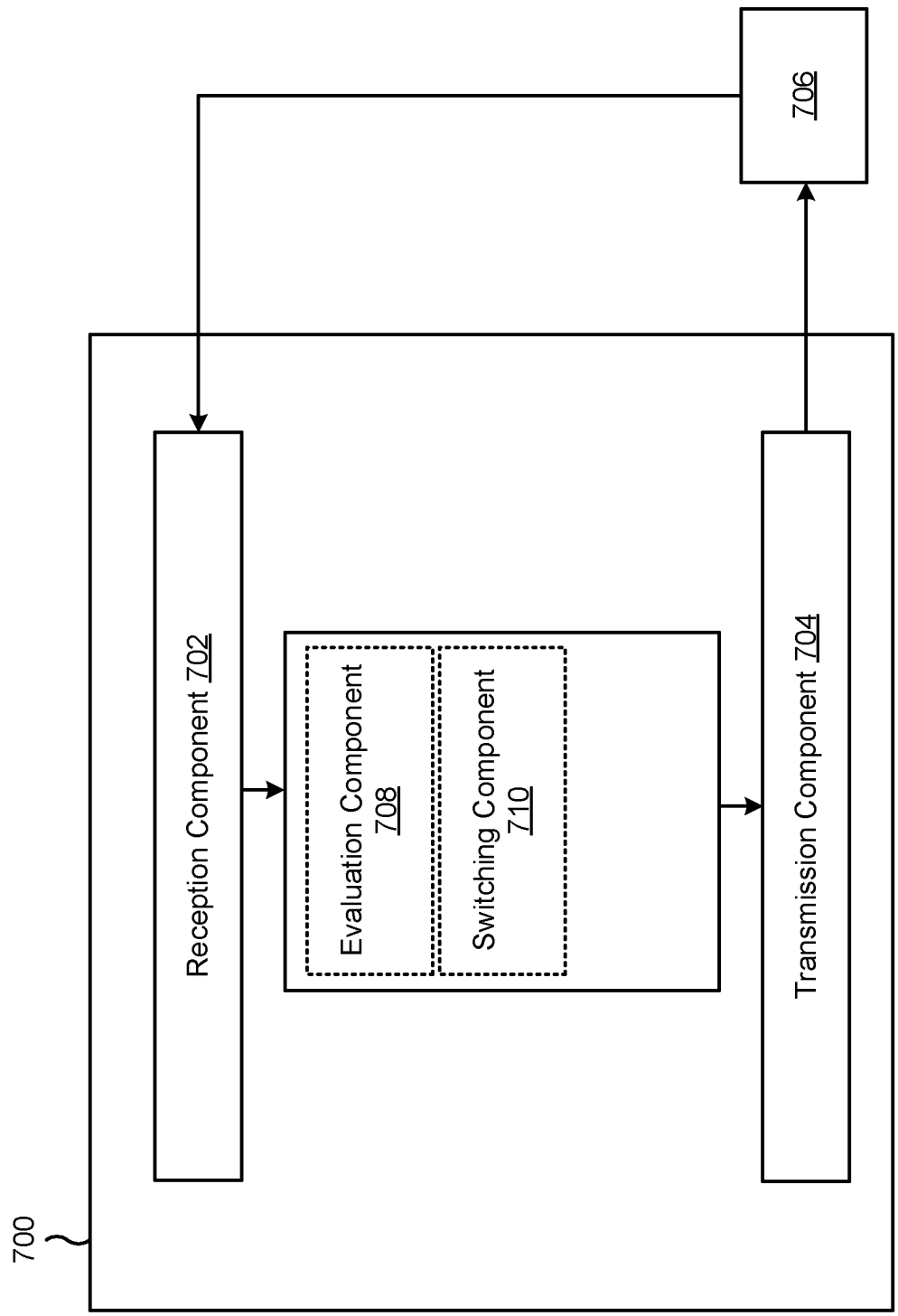
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an evaluation component 708 or a switching component 710, among other examples.

In some aspects, the apparatus 700 may be configured to perform one or more operations described herein in connection with FIGS. 1-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The evaluation component 708 may obtain at least two signal measurements for each transmit antenna of the UE based at least in part on detecting one or more triggering conditions for switching one or more transmit antennas of the UE. The switching component 710 may switch the one or more transmit antennas based at least in part on the at least two signal measurements for each transmit antenna.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: obtaining at least two signal measurements for each transmit antenna of the UE based at least in part on detecting one or more triggering conditions for switching one or more transmit antennas of the UE; and switching the one or more transmit antennas based at least in part on the at least two signal measurements for each transmit antenna.

Aspect 2: The method of Aspect 1, wherein the one or more triggering conditions include detection of a problem with uplink transmission from a transmit antenna.

Aspect 3: The method of Aspect 1 or 2, wherein the one or more triggering conditions include transmitting a random access channel message with a maximum allowable transit power.

Aspect 4: The method of any of Aspects 1-3, wherein the one or more triggering conditions include transmitting one or more random access channel (RACH) messages, and wherein an average transmit power of the one or more RACH messages satisfies a power threshold.

Aspect 5: The method of any of Aspects 1-4, wherein the one or more triggering conditions include transmitting one or more random access channel messages, filtered via an infinite impulse response type filter, that satisfy a power threshold.

Aspect 6: The method of any of Aspects 1-5, wherein the one or more triggering conditions include receiving a negative acknowledgment after transmitting a random access channel (RACH) message.

Aspect 7: The method of Aspect 6, wherein the RACH message is a msg1.

Aspect 8: The method of Aspect 6, wherein the RACH message is a msg3.

Aspect 9: The method of any of Aspects 1-8, wherein the one or more triggering conditions include expiration of a random access response window without the UE receiving a random access channel msg2.

Aspect 10: The method of any of Aspects 1-9, wherein the one or more triggering conditions include expiration of a contention resolution timer without the UE receiving a random access channel msg4.

Aspect 11: The method of any of Aspects 1-10, wherein the one or more triggering conditions include receiving a secondary cell medium access control control element (MAC CE) activation command.

Aspect 12: The method of any of Aspects 1-11, wherein the obtaining includes obtaining the at least two signal measurements after transmitting a radio resource control connection setup complete message.

Aspect 13: The method of any of Aspects 1-12, wherein the obtaining includes measuring signals of each transmit antenna to obtain the at least two signal measurements for each transmit antenna.

Aspect 14: The method of any of Aspects 1-12, wherein the obtaining includes obtaining, as the at least two signal measurements for each transmit antenna, at least two stored signal measurements having respective ages that satisfy a freshness threshold.

Aspect 15: The method of any of Aspects 1-12, wherein the obtaining includes: obtaining, as a first signal measurement of the at least two signal measurements for each transmit antenna, a stored signal measurement having an age that satisfies a freshness threshold; and measuring, as a second signal measurement of the at least two signal measurements, a signal of each transmit antenna.

Aspect 16: The method of any of Aspects 1-15, wherein the switching includes switching to a transmit antenna with at least two reference signal received power (RSRP) measurements that satisfy an RSRP threshold.

Aspect 17: The method of any of Aspects 1-16, wherein the switching includes switching to a transmit antenna with a greater reference signal received power than a current transmit antenna.

Aspect 18: The method of any of Aspects 1-17, wherein the switching includes switching to a transmit antenna with at least two transmit power headroom measurements that satisfy a transmit power headroom threshold.

Aspect 19: The method of any of Aspects 1-18, wherein the switching includes switching to a transmit antenna with a greater transmit power headroom than a transmit power headroom of a current transmit antenna.

Aspect 20: The method of any of Aspects 1-19, wherein the switching includes switching to a transmit antenna with at least two signal-to-noise ratio (SNR) measurements that satisfy an SNR threshold.

Aspect 21: The method of any of Aspects 1-20, wherein the switching includes switching to a transmit antenna with a greater signal-to-noise ratio (SNR) than an SNR of a current transmit antenna.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the memory and the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, individually or collectively configured to cause the UE to:
      detect one or more triggering conditions, associated with a random access procedure, for obtaining at least two signal measurements for each transmit antenna of the UE;
      obtain the at least two signal measurements for each transmit antenna of the UE based at least in part on detection of the one or more triggering conditions; and
      switch the one or more transmit antennas based at least in part on the at least two signal measurements for each transmit antenna.

2. The UE of claim 1, wherein the one or more triggering conditions include detection of a problem with uplink transmission, associated with the random access procedure, from a transmit antenna.

3. The UE of claim 1, wherein the one or more triggering conditions include transmission of a random access channel message with a maximum allowable transmit power.

4. The UE of claim 1, wherein the one or more triggering conditions include transmission of one or more random access channel (RACH) messages, and wherein an average transmit power of the one or more RACH messages satisfies a power threshold.

5. The UE of claim 1, wherein the one or more triggering conditions include transmission of one or more random access channel messages, filtered via an infinite impulse response type filter, that satisfy a power threshold.

6. The UE of claim 1, wherein the one or more triggering conditions include reception of a negative acknowledgement after transmission of a random access channel (RACH) message.

7. The UE of claim 6, wherein the RACH message is a msg1.

8. The UE of claim 6, wherein the RACH message is a msg3.

9. The UE of claim 1, wherein the one or more triggering conditions include expiration of a random access response window without a reception of a random access channel msg2 at the UE.

10. The UE of claim 1, wherein the one or more triggering conditions include expiration of a contention resolution timer without a reception of a random access channel msg4 at the UE.

11. The UE of claim 1, wherein the one or more triggering conditions include reception of a secondary cell medium access control control element (MAC CE) activation command.

12. The UE of claim 1, wherein the one or more processors are configured to obtain the at least two signal measurements after transmission of a radio resource control connection setup complete message.

13. The UE of claim 1, wherein the one or more processors, to obtain the at least two signal measurements, are configured to measure signals of each transmit antenna to obtain the at least two signal measurements for each transmit antenna.

14. The UE of claim 1, wherein the one or more processors are configured to obtain, as the at least two signal measurements for each transmit antenna, at least two stored signal measurements with respective ages that satisfy a freshness threshold.

15. The UE of claim 1, wherein the one or more processors are configured to:
   obtain, as a first signal measurement of the at least two signal measurements for each transmit antenna, a stored signal measurement with an age that satisfies a freshness threshold; and
   measure, as a second signal measurement of the at least two signal measurements, a signal of each transmit antenna.

16. The UE of claim 1, wherein the one or more processors are configured to switch to a transmit antenna with at least two reference signal received power (RSRP) measurements that satisfy an RSRP threshold.

17. The UE of claim 1, wherein the one or more processors are configured to switch to a transmit antenna with a greater reference signal received power than a current transmit antenna.

18. The UE of claim 1, wherein the one or more processors are configured to switch to a transmit antenna with at least two transmit power headroom measurements that satisfy a transmit power headroom threshold.

19. The UE of claim 1, wherein the one or more processors are configured to switch to a transmit antenna with a greater transmit power headroom than a transmit power headroom of a current transmit antenna.

20. The UE of claim 1, wherein the one or more processors are configured to switch to a transmit antenna with at least two signal-to-noise ratio (SNR) measurements that satisfy an SNR threshold.

21. The UE of claim 1, wherein the one or more processors are configured to switch to a transmit antenna with a greater signal-to-noise ratio (SNR) than an SNR of a current transmit antenna.

22. A method of wireless communication performed by a user equipment (UE), comprising:
   detecting one or more triggering conditions, associated with a random access procedure, for obtaining at least two signal measurements for each transmit antenna of the UE;
   obtaining the at least two signal measurements for each transmit antenna of the UE based at least in part on detecting the one or more triggering conditions; and
   switching the one or more transmit antennas based at least in part on the at least two signal measurements for each transmit antenna.

23. The method of claim 22, wherein the one or more triggering conditions include detection of a problem with uplink transmission, associated with the random access procedure, from a transmit antenna.

24. The method of claim 22, wherein the one or more triggering conditions include transmitting a random access channel message with a maximum allowable transmit power.

25. The method of claim 22, wherein the one or more triggering conditions include transmitting one or more random access channel (RACH) messages, and wherein an average transmit power of the one or more RACH messages satisfies a power threshold.

26. The method of claim 22, wherein the one or more triggering conditions include transmitting one or more random access channel messages, filtered via an infinite impulse response type filter, that satisfy a power threshold.

27. The method of claim 22, wherein the one or more triggering conditions include receiving a negative acknowledgement after transmitting a random access channel (RACH) message.

28. The method of claim 22, wherein the one or more triggering conditions include expiration of a random access response window without the UE receiving a random access channel msg2.

29. The method of claim 22, wherein the one or more triggering conditions include expiration of a contention resolution timer without the UE receiving a random access channel msg4.

30. The method of claim 22, wherein the one or more triggering conditions include receiving a secondary cell medium access control control element (MAC CE) activation command.

* * * * *